United States Patent
Schwendinger et al.

(10) Patent No.: US 7,159,790 B2
(45) Date of Patent: Jan. 9, 2007

(54) THERMOSTAT WITH OFFSET DRIVE

(75) Inventors: Paul G. Schwendinger, St. Louis Park, MN (US); Jason L. Ableitner, Hopkins, MN (US); Tim M. Redmann, Carver, MN (US)

(73) Assignee: Honeywell International Inc., Morristown, NJ (US)

( * ) Notice: Subject to any disclaimer, the term of this patent is extended or adjusted under 35 U.S.C. 154(b) by 210 days.

(21) Appl. No.: 10/874,082

(22) Filed: Jun. 22, 2004

(65) Prior Publication Data

US 2005/0279841 A1    Dec. 22, 2005

(51) Int. Cl.
*F24F 11/53* (2006.01)
*G05D 23/00* (2006.01)
*G05D 23/12* (2006.01)

(52) U.S. Cl. .............. 236/1 C; 236/47; 236/78 D; 236/94; 388/824

(58) Field of Classification Search ............ 236/1 C, 236/47, 78 D, 94; 388/824
See application file for complete search history.

(56) References Cited

U.S. PATENT DOCUMENTS

| | | | |
|---|---|---|---|
| 2,729,719 A | | 1/1956 | Kronmiller |
| 3,825,182 A | * | 7/1974 | Bauchmann ............ 236/1 C |
| 4,114,445 A | * | 9/1978 | Nelson ................. 236/91 G |
| 4,248,375 A | * | 2/1981 | Whitney ................ 236/46 R |
| 4,414,520 A | | 11/1983 | Ruuth |
| 4,449,832 A | | 5/1984 | Kammerer |
| 4,456,169 A | | 6/1984 | Martin |
| 4,621,336 A | | 11/1986 | Brown |
| 4,646,964 A | | 3/1987 | Parker et al. |
| 4,669,654 A | | 6/1987 | Levine et al. |
| 4,685,614 A | | 8/1987 | Levine |
| 4,751,961 A | | 6/1988 | Levine et al. |
| 5,107,918 A | | 4/1992 | McFarlane et al. |
| 5,148,979 A | | 9/1992 | Brueton |
| 5,194,842 A | | 3/1993 | Lau et al. |
| 5,211,332 A | | 5/1993 | Adams |
| 5,303,612 A | | 4/1994 | Odom et al. |
| 5,542,279 A | | 8/1996 | Erdman et al. |
| 5,673,850 A | | 10/1997 | Uptegraph |
| 5,943,917 A | | 8/1999 | Truong et al. |
| 6,741,158 B1 | | 5/2004 | Engler et al. |

OTHER PUBLICATIONS

Carrier, "Thermostats: Carrier HVAC Parts," 52 pages, printed Oct. 14, 2003, http:///www.carrierhvacparts.com/Merchant2/merchant.mv.
Ritetemp, "The RiteTemp Support Site—8099 Technical Supprt Page," 1 page, printed Oct. 14, 2003, http:///www.ritetemp-thermostats.com/8099.html.
Ritetemp, "The RiteTemp Supprt Site—What Thermostat," 1 page, printed Oct. 14, 2003, http://www.ritetemp-thermostats.com/What_Thermostat.html.
Ritetemp, "Install Guide 8095," 7 pages, prior to filing date of present application.
Ritetemp, "Install Guide 8099," 8 pages, prior to filing date of present application.

* cited by examiner

*Primary Examiner*—Marc Norman (57) ABSTRACT

A thermostat having a thermostat housing and a rotatable selector rotatably coupled to the thermostat housing via a support member. The rotatable selector is adapted to have a range of rotatable positions, wherein a desired parameter value is identified by the position of the rotatable selector along the range of rotatable positions. The thermostat further includes a mechanical to electrical translator that is laterally offset relative to the support member for translating the mechanical position of the rotatable selector to an electrical signal that is related to the desired parameter value.

39 Claims, 10 Drawing Sheets

THERMOSTAT WITH OFFSET DRIVE

BACKGROUND

Thermostats are used widely in dwellings, buildings, and other temperature-controlled spaces. In many cases, the thermostats are mounted on a wall or the like to allow for the measurement and control of the temperature, humidity and/or other environmental parameter within the space. Thermostats come in a variety of shapes and with a variety of functions. Some thermostats are electromechanical in nature, and often use a bimetal coil to sense and control the temperature setting, typically by shifting the angle of a mercury bulb switch. These thermostats typically have a mechanical user interface, such as a rotating knob or the like, to enable the user to set a temperature set point. More advanced electronic thermostats have built in electronics, often with solid state sensors, to sense and control various environmental parameters within a space. The user interface of many electronic thermostats includes software controlled buttons and a display.

It has been found that while electronic thermostats often provide better control, thermostats with a mechanical user interface can often be more intuitive to use for some users. Many users, for example, would be comfortable with a rotating knob that is disposed on a thermostat for setting a desired set point or other parameter. However, to provide increased functionality and/or user feedback, it has been found that locating non-rotating parts such as displays, buttons, indicator lights, noise making devices, logos, and/or other devices or components near and/or inside the rotating knob or member can be desirable. The present invention provides methods and apparatus for locating such non-rotating parts near or inside of a rotating knob or member, while still allowing the rotating knob or member to set and/or control one or more parameters of the thermostat.

SUMMARY

The present invention relates generally to an improved thermostat that has a rotatable user interface member. In some cases, one or more non-rotatable component or device, such as a display, a button, an indicator light, a noise making device, a logo, and/or other suitable device or component, may be received by an opening or recess provided in the rotatable user interface member.

In one illustrative embodiment, a thermostat has a selectable temperature set point and a temperature sensor. The temperature sensor provides a temperature indicator and the thermostat provides a control signal that is dependent at least in part on the selected temperature set point and the temperature indicator. While temperature is used in this example, it is contemplated that any environmental condition or control parameter may be sensed, set and/or controlled, as desired.

The illustrative thermostat can include a thermostat housing and a rotatable selector fixed to the thermostat housing via a support member, such as a support post or the like. The rotatable selector may have a defined or undefined range of rotatable positions. In one illustrative embodiment, a set point or other desired parameter is identified by the position of the rotatable selector along the range of rotatable positions. A mechanical to electrical translator is then laterally offset relative to the support post for translating the mechanical position of the rotatable selector to an electrical signal that is related to the selected set point or parameter value. In some cases, the support post is disposed at a centroid of the rotatable selector surface area, but this is not required in all embodiments.

The mechanical to electrical translator may include a pot or any other suitable mechanical to electrical translator. In some cases, the mechanical to electrical translator includes a rotatable shaft which is mechanically rotated in response to rotation of the rotatable selector. Gears, belts, wheels, rods, or any other mechanical mechanism may be used to mechanically rotate the rotatable shaft of the mechanical to electrical translator in response to rotation of the rotatable selector. Alternatively, or in addition, optical, magnetic or any other suitable detection mechanism may be used to help translate the mechanical position of the rotatable selector to a corresponding electrical signal.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

Figure 1:
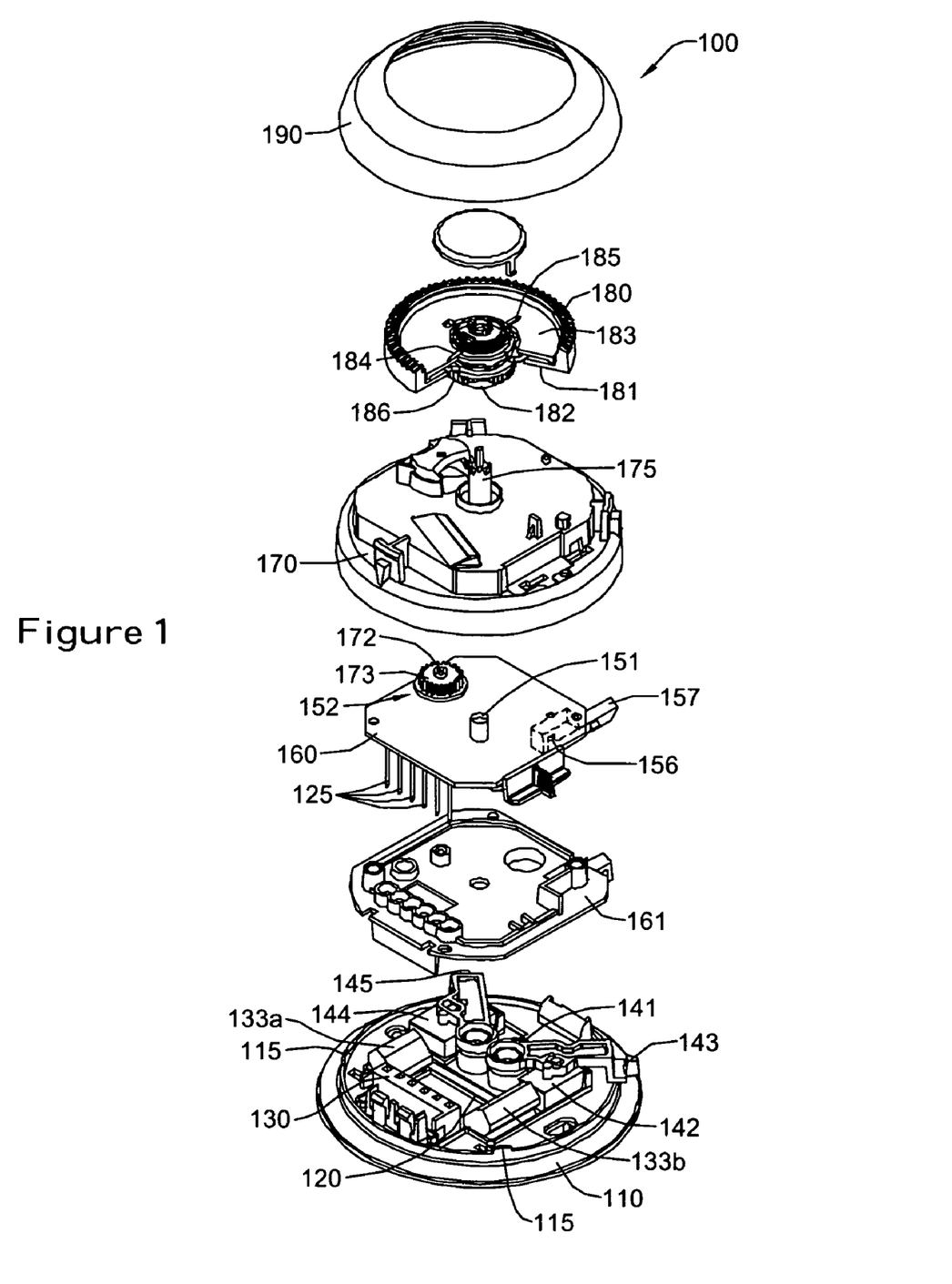
FIG. 1 is a perspective exploded view of an illustrative thermostat.

FIG. 1 is a perspective exploded view of an illustrative thermostat 100. The illustrative thermostat includes a base plate 110 which is configured to be mounted on a wall by any number of fastening means such as, for example, screws or adhesive. The illustrative base plate 110 has a circular shape, but it is contemplated that the base plate 110 can have any shape as desired. In an illustrative embodiment, the base plate has a diameter in the range of 8 cm to 12 cm.

The base plate 110 can include a printed circuit board 120. In the embodiment shown, the printed circuit board 120 is affixed to base plate 110 on the opposite side shown. Depending on the requirement of the space controlling system, anywhere from two to six wires are typically used to interconnect the remotely located HVAC components (e.g. furnace, boiler, air conditioner, humidifier, etc.) to the base plate 110 at terminal blocks 133a and 133b. In this illustrative embodiment, a variety of switches are disposed on the base plate 110 and in electrical connection with the printed circuit board 120. A fuel switch 141 is shown located near the center of the base plate 110. The fuel switch 141 can switch between E (electrical) and F (fuel). A FAN ON/AUTOMATIC switch 142 and corresponding lever 143 is shown disposed on the base plate 110. The FAN ON/AUTOMATIC switch 142 can be electrically coupled to the printed circuit board 120. A COOL/OFF/HEAT switch 144 and corresponding lever 145 is shown disposed on the base plate 110. The COOL/OFF/HEAT switch 145 can also be electrically coupled to the printed circuit board 120. The printed circuit board 120 can be electrically coupled to a second printed circuit board 160 by a plurality of leads 125 that are fixed relative to the second printed circuit board 160. The leads 125 extend through a PCB Shield 161 and mate with a connector 130 that is connected to the first printed circuit board 120.

In the illustrative embodiment shown, a potentiometer assembly 152 is shown having a rotatable potentiometer shaft 172 and a gear 173. In some embodiments, the rotatable potentiometer shaft 172 and the gear 173 may be separate pieces and subsequently secured together, or may be formed as a single piece, as desired. While a circular gear 173 is shown, it is contemplated that the any suitable gear may be used including, for example, a sector gear, a screw type gear or any other suitable type of gear, as desired.

In the illustrative embodiment, the potentiometer assembly 152 is fixed relative to and electrically coupled to the second printed circuit board 160. The potentiometer assembly 152 is shown offset from a center 151 of the second printed circuit board 160. The potentiometer assembly 152 can provide a mechanical translation of the position of the gear 173 to a corresponding electrical signal. The electrical signal provided by the potentiometer assembly 152 may correspond to a desired set point or other control parameter that can be read by electronics on the second printed circuit board 160 to help control one or more HVAC devices. While a potentiometer is used in the illustrative embodiment, it is contemplated that any suitable mechanical position to electrical signal translator may be used including, for example, mechanical sliders, magnetic position sensors, optical position sensors, or any other suitable mechanical to electrical translator, as desired.

A temperature sensor, or in the illustrative embodiment, a thermistor (not shown) is fixed relative to and electrically coupled to the second printed circuit board 160. In the illustrative embodiment shown, the temperature sensor or thermistor can be located near an edge of the second printed circuit board 160 in some embodiments. However, it is contemplated that the thermistor may be located at any position on or near the second printed circuit board 160, as desired.

A light source 156 is shown disposed on and electrically coupled to the second printed circuit board 160. The light source can be, for example, an LED or any other suitable light source. In the illustrative embodiment, the light source 156 is positioned adjacent to a light guide 157. The light guide 157 is shown extending away from the second printed circuit board 160, and through an intermediate housing 170.

The intermediate housing 170 is shown disposed over the second printed circuit board 160 and base plate 110. The intermediate housing 170 can be fixed relative to the second printed circuit board 160, if desired. The intermediate housing 170 includes a support post 175 that extends away from the intermediate housing 170 as shown. In the illustrative embodiment, the support post 175 is located at or near a center or centroid of the intermediate housing 170, but this is not required.

The potentiometer shaft 172 can extend from the gear 173 through the intermediate housing 170 to a potentiometer (not explicitly shown) that is electrically coupled to the second printed circuit board 160. In one embodiment, the potentiometer shaft 172 is rotatable, and is laterally offset from the support post 175.

A rotatable selector 180 is shown disposed about the support post 175. The illustrative rotatable selector 180 is shown having a circular annular shape. However, this is not required. For example, the rotatable selector 180 may have a circular semi-annular shape, a square shape, a hexagonal shape or any other suitable shape, as desired. The rotatable selector 180 can include a planar portion 181 and a sleeve 182. The sleeve 182 is shown disposed on the planar portion 181 and extends away form the planar portion 181. In the illustrative embodiment, the sleeve 182 is located at or near a center or centroid of the rotatable selector 180, but this is not required.

A circular gear 186 is shown disposed about the sleeve 182. In some embodiments, the circular gear 186 and the rotatable selector 180 may be separate pieces and subsequently secured together, or may be formed as a single piece, as desired. The circular gear 186 can be configured to engage the potentiometer circular gear 173 so that the potentiometer gear 173 moves as the rotatable selector gear 186 moves. The sleeve 182 is disposed about the support post 175 and is adapted to allow for rotational movement of the rotatable selector 180 about the support post 175.

A scale plate 183 can be disposed adjacent the planar portion 181 and fixed in a non-rotating manner to the support post 175. The scale plate 183 can include indicia such as, for example, temperature indicia for both a current temperature and a set point temperature. A current temperature indicator 184 can be fixed to the scale plate 183 and can be formed of a bimetal coil, if desired. A set point temperature indicator 185 can be fixed to the planar portion 181. Thus, in this illustrative embodiment, the rotatable selector 180 and set point temperature indicator 185 rotate relative to the scale plate 183 and current temperature indicator 184.

Figure 2:
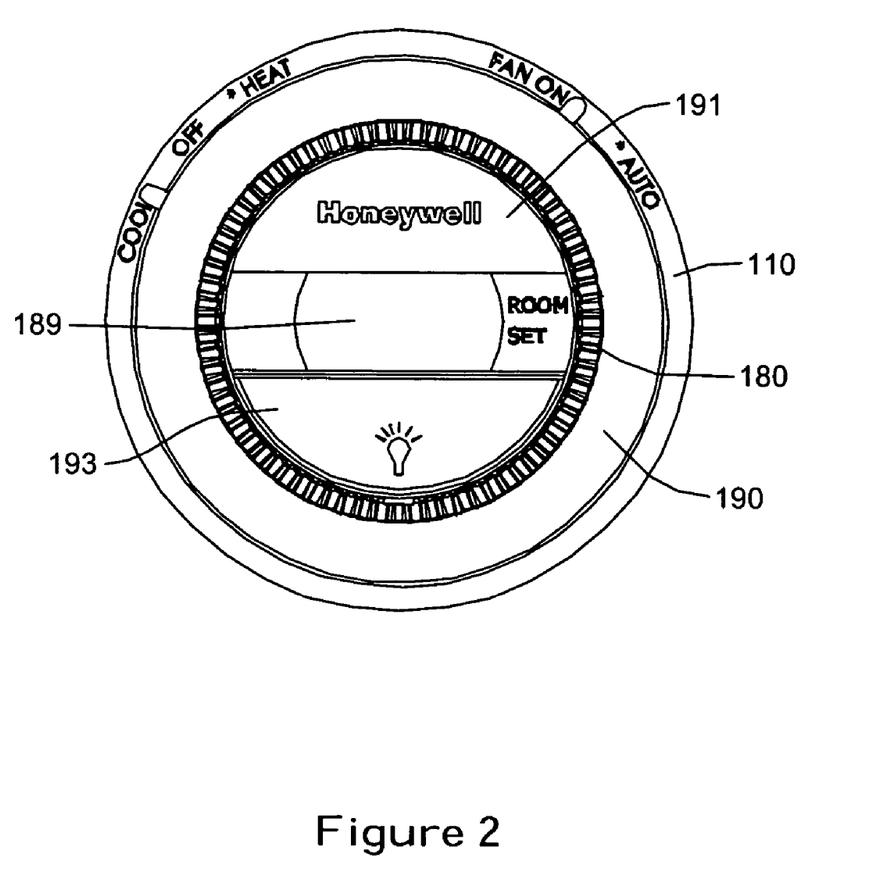
FIG. 2 shows a front perspective view of an illustrative thermostat that includes a display.

In some embodiments, a display (e.g. LCD display), one or more buttons, indicator lights, noise making devices, logos, and/or other devices and/or components may be fixed to the support post 175, if desired, wherein the rotatable selector 180 may rotate relative to these other devices and/or components. For example, FIG. 2 shows an illustrative thermostat that includes a display 189, which is fixed relative to the support post 175, wherein rotatable selector 180 may rotate about the display 189. In some illustrative embodiments, a desired parameter value (e.g. temperature set point) is displayed on the display 189, and in some cases, the desired parameter value that is displayed on the display 189 changes as the rotatable selector 180 is rotated. In some embodiments, the current temperature and/or the temperature set point may be displayed on the display 189, as well as other information as desired. The illustrative thermostat of FIG. 2 also shows a logo region 191 and a back light button 193, both of which may also be fixed relative to the support member or post 175, wherein rotatable selector 180 may rotate about the logo region 191 and back light button 193.

FIG. 1 also shows an outer housing 190 disposed on the intermediate housing 170. In the illustrative embodiment, the outer housing 190 has an annular shape, however the outer cover 190 can have any suitable shape, as desired.

Figure 3:
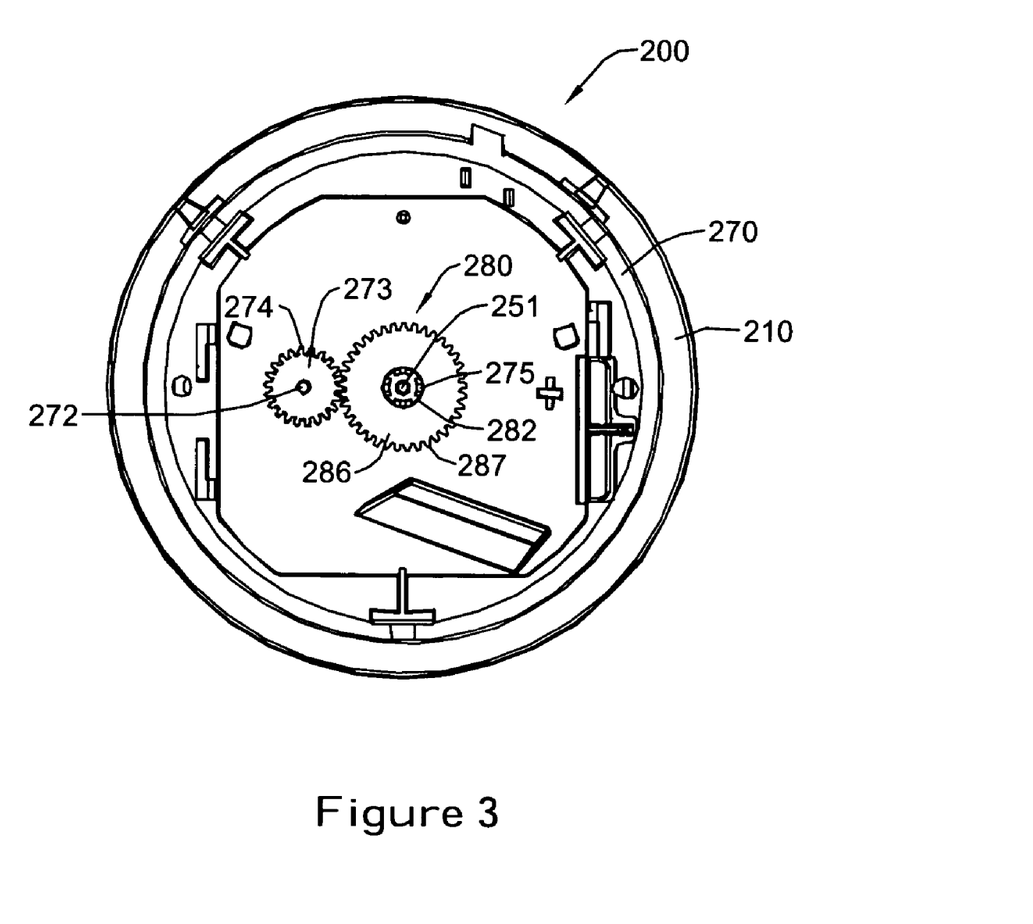
FIG. 3 is a top view of a partial thermostat showing an exemplary offset drive.

FIG. 3 is a perspective view of an illustrative thermostat 200 showing an offset drive in accordance with an illustrative embodiment of the present invention. In this embodiment, the thermostat 200 has a selected temperature set point and a temperature sensor (not shown). The temperature sensor provides a temperature indicator and the thermostat provides a control signal that is dependent at least in part on the selected temperature set point and the temperature indicator. The thermostat 200 includes a thermostat housing 270, a rotatable selector 280 fixed to the thermostat housing 270 via a support post 275. The rotatable selector 280 has a defined or undefined range of rotatable positions.

In the illustrative embodiment of FIG. 3, the set point is identified by the position of the rotatable selector 280 along the range of rotatable positions. FIG. 3 shows a rotatable selector sleeve 282 disposed about the fixed support post 275. The rotatable selector sleeve 282 can be disposed at or near the centroid of the rotatable selector 180, but this is not required. The rotatable selector sleeve 282 is adapted to be rotatable about the support post 275. Thus, in the illustrative embodiment, the rotatable selector sleeve 282 rotates in unison with the rotatable selector 180.

In the illustrative embodiment, the rotatable selector sleeve 282 is fixed to a rotatable selector gear 286. In some embodiments, the rotatable selector gear 286 and the rotatable selector 280 may be separate pieces and subsequently secured together, or may be formed as a single piece, as desired.

A mechanical to electrical translator including, for example, a potentiometer, is shown laterally offset relative to the support post 275. The mechanical to electrical translator translates the mechanical position of the rotatable selector 280 to an electrical signal that is related to the position of the rotatable selector 280. In the illustrative embodiment, the potentiometer includes a rotatable shaft 272 that includes or is attached to one or more gears 273. In one embodiment, the potentiometer gear 273 and a rotatable selector gear 286 translate the mechanical position of the rotatable selector 280 to a mechanical position of the rotatable potentiometer shaft 272 of the potentiometer, and the potentiometer translates the mechanical position of rotatable potentiometer shaft 272 to an electrical signal that is related to the mechanical position of the rotatable selector 280.

In the illustrative embodiment shown, potentiometer gear 273 extends 360 degrees around the rotatable potentiometer shaft 272. The rotatable selector gear 286 also is shown extending 360 degrees around the rotatable selector sleeve 282. In some embodiments, the rotatable selector gear 286 can have a circumference 287 that is equal to, greater than, or less than, the circumference 274 of the one or more potentiometer gears 273, to provide a desired gearing ratio.

In the illustrative embodiment, the rotatable selector sleeve 282 (and affixed rotatable selector 280) can rotate any desired number of degrees about the support post 275. In some embodiments, the rotatable selector sleeve 282 rotates in a range of 180 degrees or less, and causes the potentiometer rotatable shaft 272 to rotate in unity with the rotatable selector sleeve 282. For example, the rotatable selector sleeve 282 can rotate a first number of degrees causing the potentiometer rotatable shaft 272 to rotate an equal number of degrees. In other embodiments, the rotatable selector sleeve 282 (and affixed rotatable selector 280) can rotate a first number of degrees, causing the potentiometer rotatable shaft 272 to rotate a second number of degrees, where the second number of degrees is greater than or less than the first number of degrees.

In one illustrative embodiment, the rotatable selector sleeve 282 can rotate through a range, where the range can be anywhere from 90 to 180 degrees, causing the potentiometer rotatable shaft 272 to rotate from 180 to 360 degrees. In this illustrative embodiment, the one or more rotatable selector gears 286 and the potentiometer gears 273 rotate in opposite directions.

Figure 4:
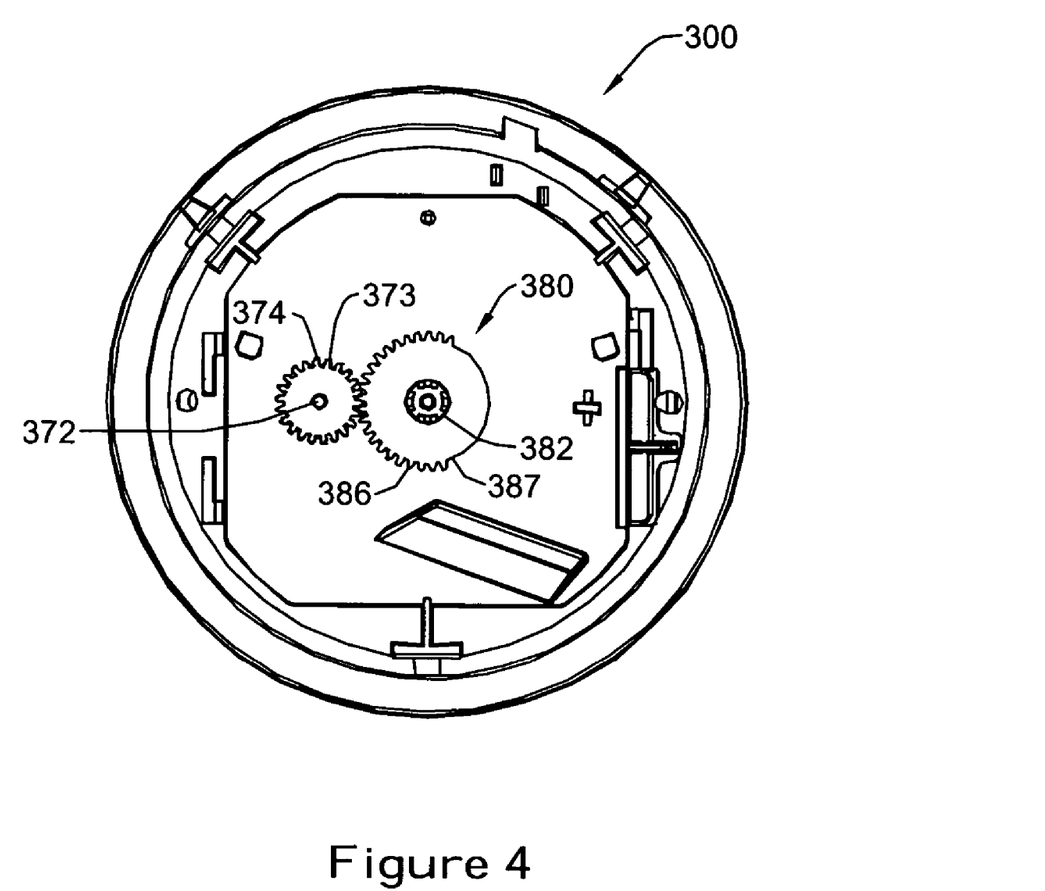
FIG. 4 through FIG. 10 illustrate further illustrative embodiments of offset drives.

FIG. 4 through FIG. 7 illustrate further exemplary embodiments of offset drives in accordance with the present invention. Referring to FIG. 4, in this illustrative embodiment of an offset drive 300, the rotatable selector 380 includes one or more gear teeth 386. One or more potentiometer gear teeth 373 engage the one or more rotatable selector gear teeth 386. The one or more potentiometer gear teeth 373 extend 360 degrees around the potentiometer rotatable shaft 372. The one or more rotatable selector gear teeth 386 extend around only a portion of the set point selector sleeve 382. In one embodiment, the one or more rotatable selector gear teeth 386 extend 180 degrees or less around the set point selector sleeve 382. The rotatable selector gear can have a circumference 387 equal to or greater than a circumference 374 of the potentiometer gear, as desired. In this embodiment, the rotatable selector gear and the potentiometer gear rotate in opposite directions.

Figure 5:
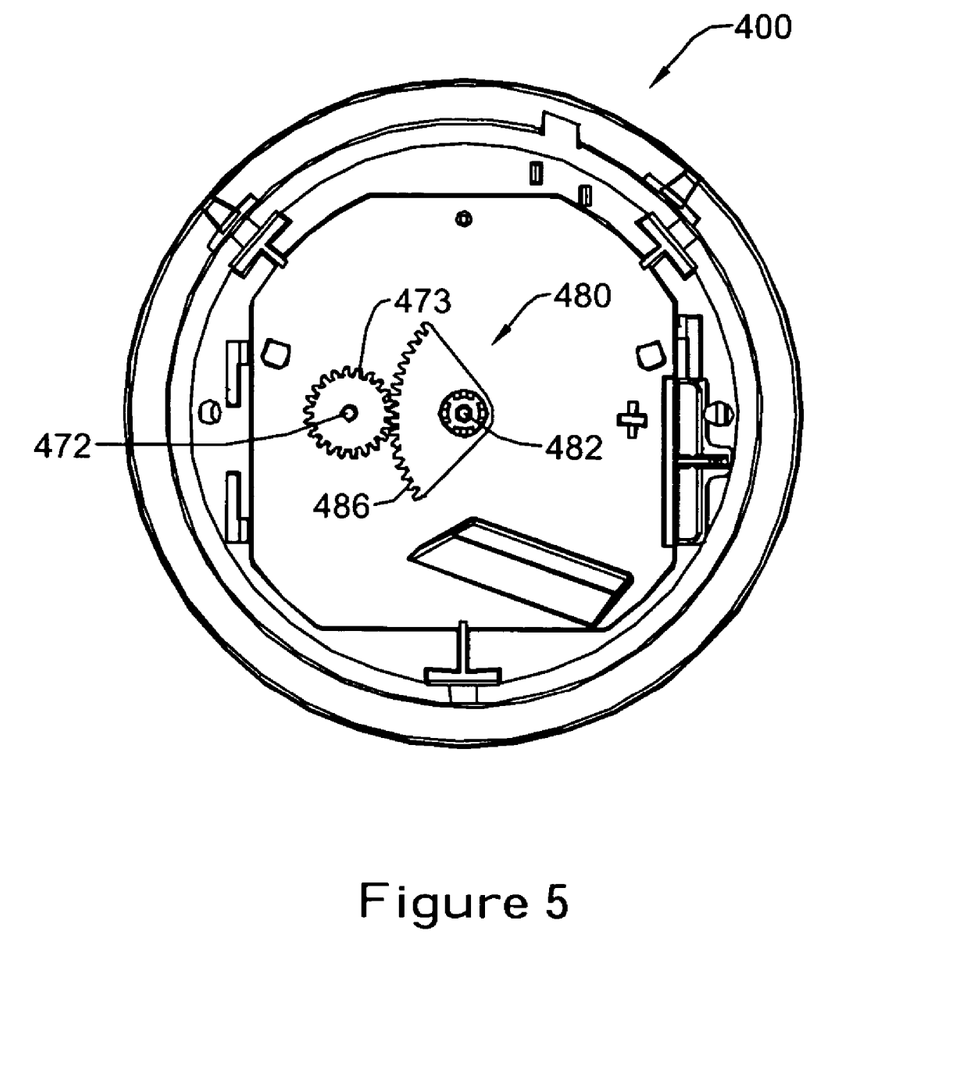

Referring to FIG. 5, in this illustrative embodiment of an offset drive 400, the rotatable selector 480 includes a sector gear having one or more gear teeth 486. The one or more potentiometer gear teeth 473 engage the one or more rotatable selector gear teeth 486. The one or more potentiometer gear teeth 473 extend 360 degrees around the potentiometer rotatable shaft 472. The one or more rotatable selector gear teeth 486 extend about an arc along the sector gear. In one embodiment, the one or more rotatable selector gear teeth 486 extend in an arc of 150 degrees or less. In this embodiment, the one or more rotatable selector gear and the potentiometer gear rotate in opposite directions.

Figure 6:
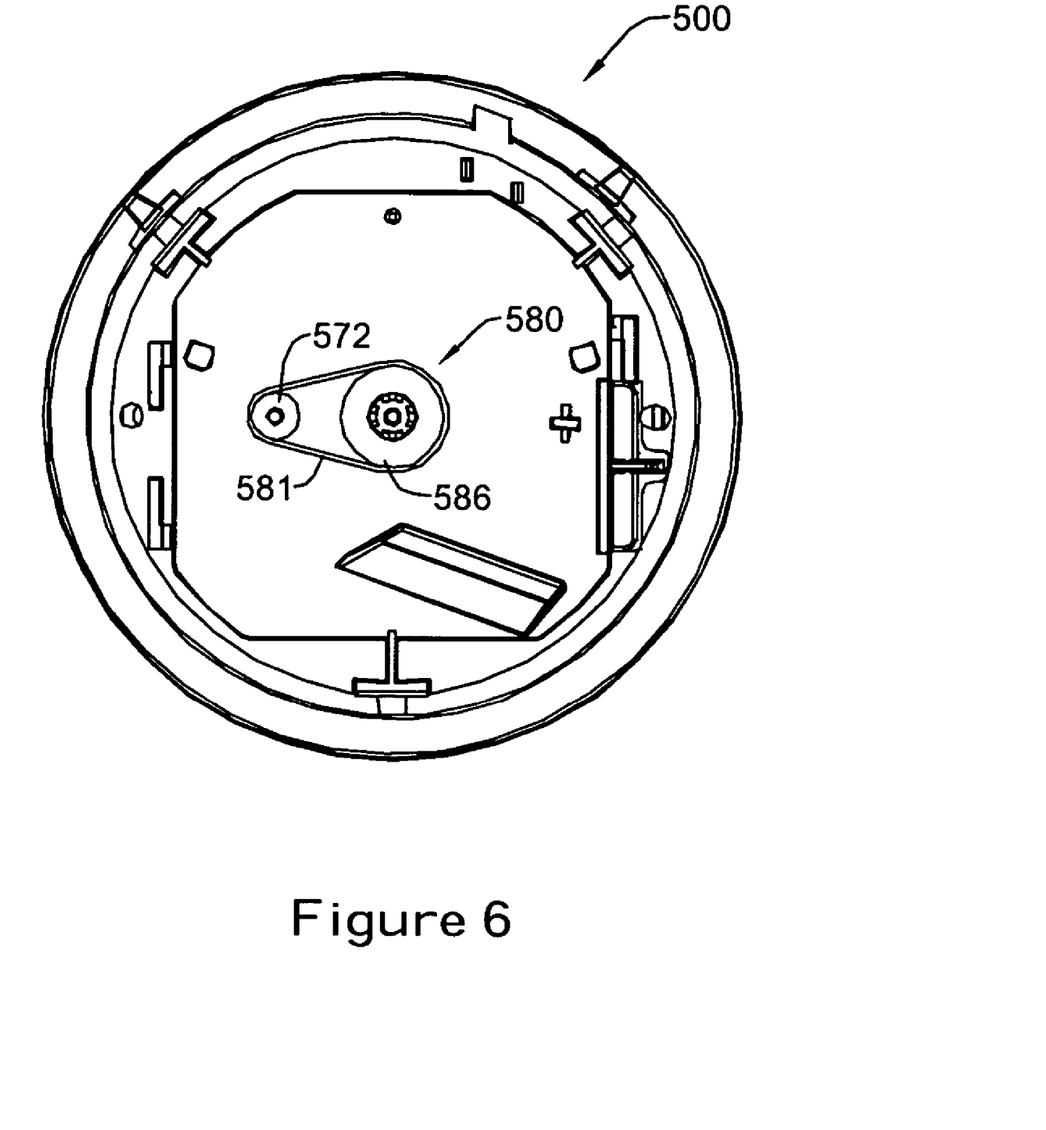

Referring to FIG. 6, in this illustrative embodiment of an offset drive 500, the rotatable selector 580 includes a selector rotatable member 586. A potentiometer rotatable member 572 is coupled to the selector rotatable member 586 with one or more belts 581. The belt 581 may be any continuous band of flexible material for transmitting motion and power or conveying materials. The one or more belts 581 translate the mechanical position of the rotatable selector 180 to a mechanical position of the rotatable member 572 of the potentiometer, and the potentiometer translates the position of rotatable member 572 to an electrical signal that is related to the selected parameter. The selector rotatable member 586 and the potentiometer rotatable member 572 can have equal or different sizes, as desired. In one embodiment, the selector rotatable member 586 has a greater diameter than the potentiometer rotatable member 572, but this is not required. In this embodiment, the selector rotatable member 586 and the potentiometer rotatable member 572 rotate in a same direction.

Figure 7:
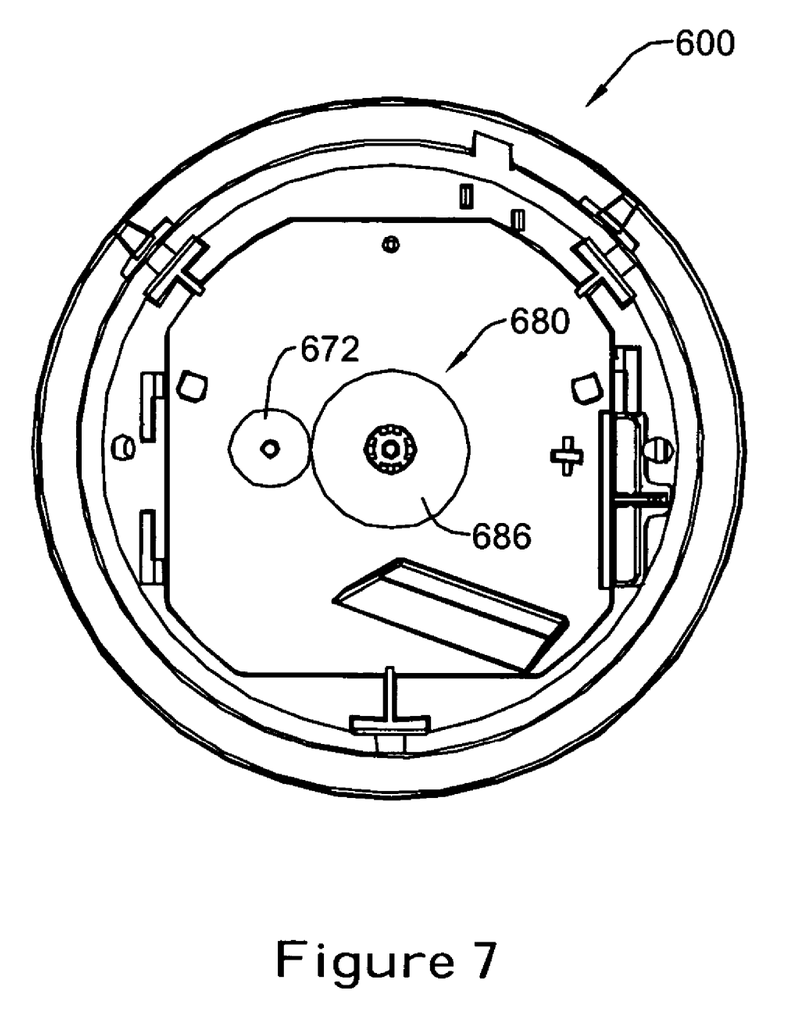

Referring to FIG. 7, in this illustrative embodiment of an offset drive 600, the rotatable selector 680 includes a selector rotatable member 686. A potentiometer rotatable member 672 is in direct contact with the selector rotatable member 686. Again, the selector rotatable member 686 and the potentiometer rotatable member 672 can have equal or different sizes, as desired. In one embodiment, the selector rotatable member 686 has a greater diameter than the potentiometer rotatable member 672, but this is not required. In some embodiments, one or both of the selector rotatable member 686 or the potentiometer rotatable member 672 have a smooth surface, but this is not required. For example, one or both of the selector rotatable member 686 or the potentiometer rotatable member 672 may have a rough surface or any other desired texture, as desired. In this embodiment, the selector rotatable member 686 and the potentiometer rotatable member 672 rotate in opposite directions.

Figure 8:
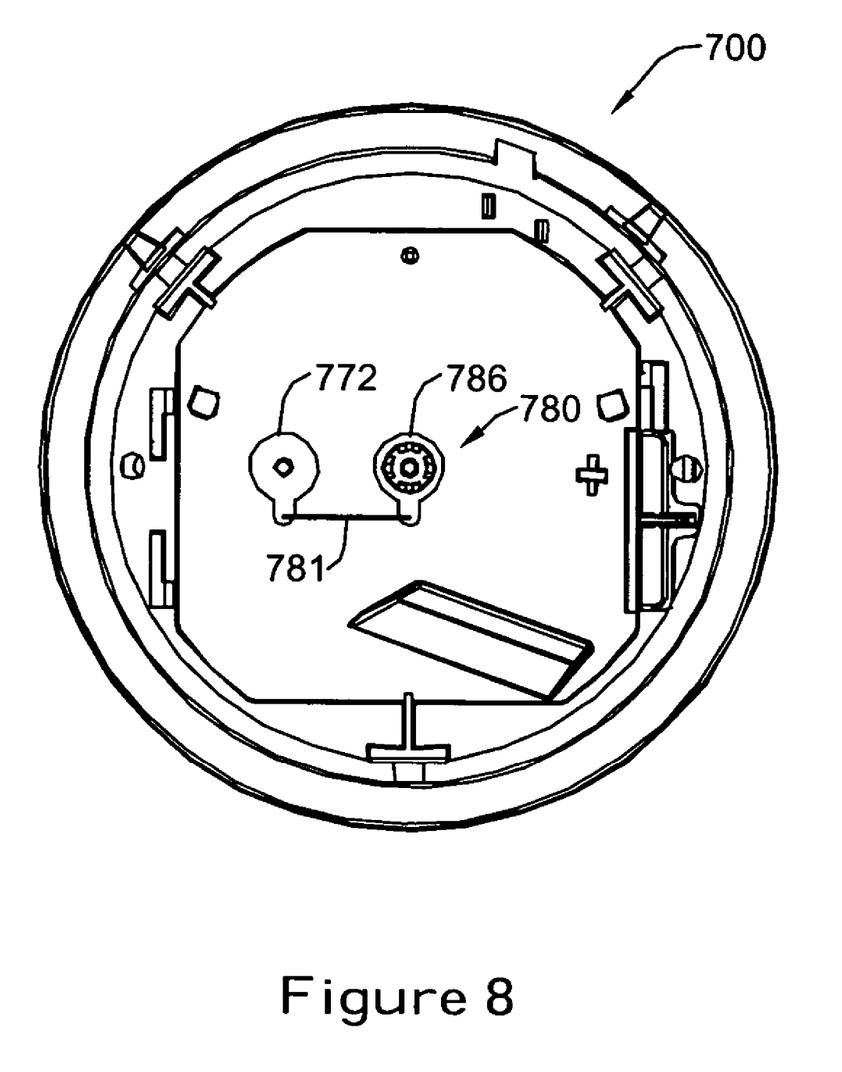

Referring to FIG. 8, in this illustrative embodiment of an offset drive 700, the rotatable selector 780 includes a selector rotatable member 786. A potentiometer rotatable member 772 is coupled to the selector rotatable member 786 with one or more tie elements 781. The one or more tie elements 781 translate the mechanical position of the rotatable selector 180 to a mechanical position of the rotatable member 772 of the potentiometer, and the potentiometer translates the position of rotatable member 772 to an electrical signal that is related to the selected parameter. The selector rotatable member 786 and the potentiometer rotatable member 772 can have equal or different sizes, as desired. In one embodiment, the tie element 781 is a rigid member, but this is not required. In this embodiment, the selector rotatable member 786 and the potentiometer rotatable member 772 rotate in a same direction.

Figure 9:
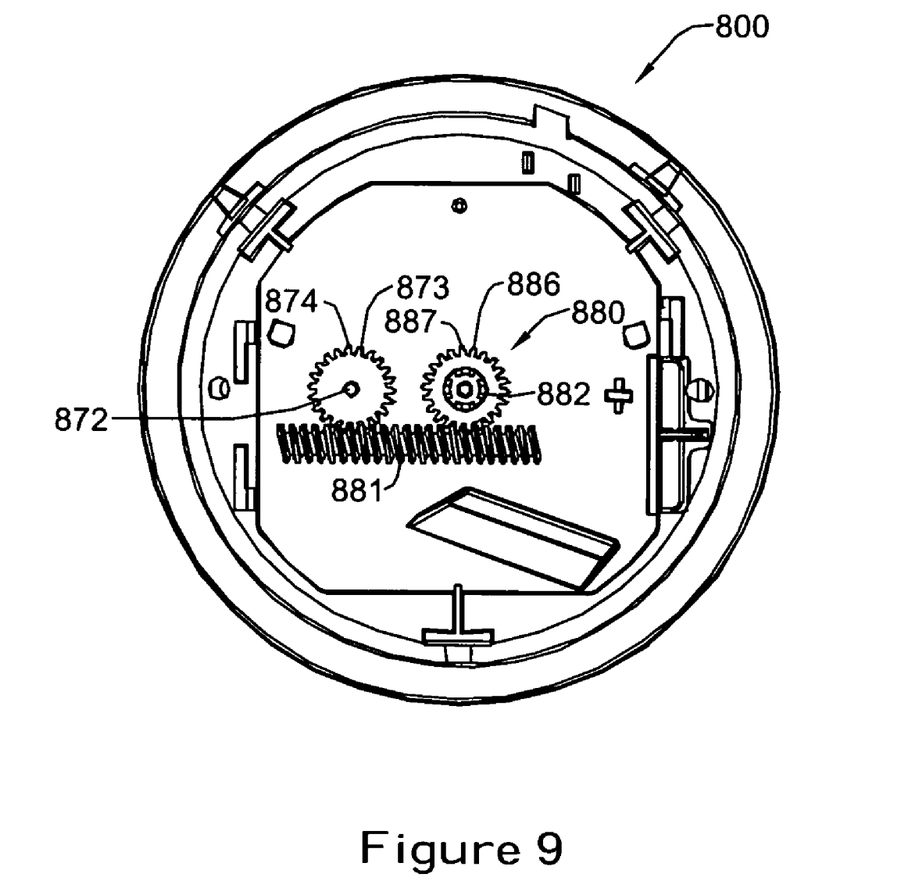

Referring to FIG. 9, in this illustrative embodiment of an offset drive 800, the rotatable selector 880 includes one or more gear teeth 886 that engage a slider or screw gear element 881. One or more potentiometer gear teeth 873 also engage the screw gear element 881. The one or more potentiometer gear teeth 873 are shown extending 360 degrees around the potentiometer rotatable shaft 872, however this not required in all embodiments. The one or more rotatable selector gear teeth 886 extend 360 degrees around the set point selector sleeve 882, however this not required in all embodiments. The rotatable selector gear 886 can have a circumference 887 equal to or greater than a circumference 874 of the potentiometer gear, as desired. In this embodiment, the rotatable selector gear 886 and the potentiometer gear 873 rotate in a same direction.

Figure 10:
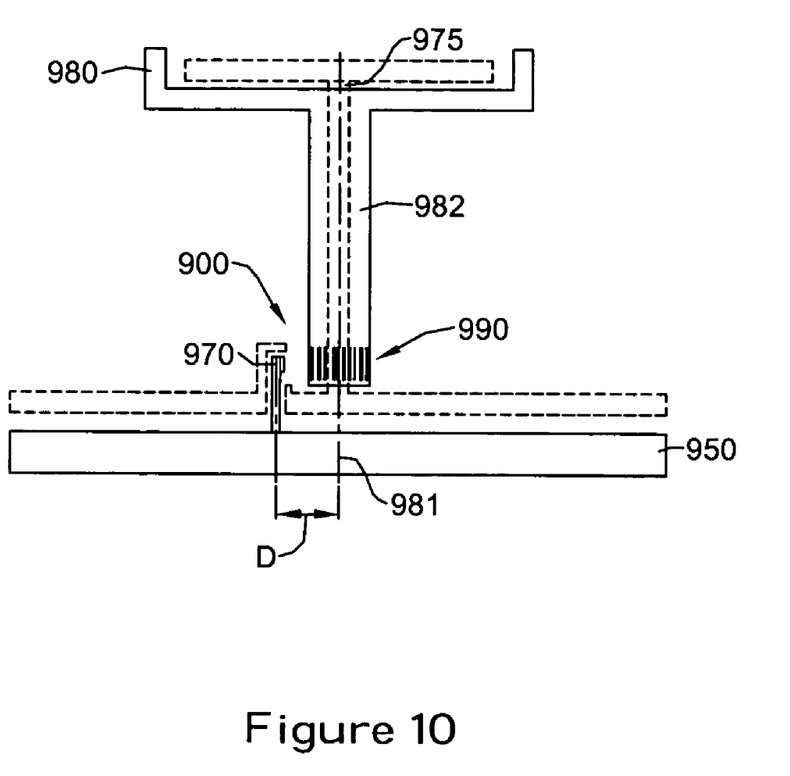

Referring to FIG. 10, in this illustrative embodiment of an offset drive 900, a rotatable selector 980 includes a sleeve 982 and a pattern 990 disposed on the sleeve 982. In one embodiment, the sleeve 982 is disposed about a fixed support post 975. The pattern 990 can be arranged such that the position of the rotatable selector 980 can be determined by monitoring the pattern. The pattern can be disposed on the rotatable selector sleeve 982 by any suitable technique such as, for example, directly printed the pattern on the rotatable selector 980, applying a pattern film (e.g., tape) on the rotatable selector 980, or by another suitable process.

A sensor 970 may be provided for sensing the pattern 990. In the illustrative embodiment, the sensor 970 is positioned adjacent the pattern 990 but laterally offset from a rotatable selector 980 rotation axis 981 by a distance D. The sensor 970 can be coupled to a circuit board 950, and can be used to determine the relative position of the rotatable selector 980 based on the sensed pattern. The sensor 970 may be an optical sensor, a magnetic sensor, or any other suitable sensor, and the pattern 990 can be an optical pattern, a magnetic pattern, or any other suitable pattern, as desired.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes may be made in details, particularly in matters of shape, size and arrangement of parts without exceeding the scope of the invention.

What is claimed is:

1. A thermostat comprising:
   a thermostat housing;
   a rotatable selector rotatably coupled to the thermostat housing via a support member, the rotatable selector having a first rotation axis, the rotatable selector having a range of rotatable positions along the first rotation axis, wherein a desired parameter value is identified by the position of the rotatable selector along the range of rotatable positions; and
   a mechanical to electrical translator comprising a second rotation axis that is laterally offset relative to the first rotation axis of the rotatable selector, the mechanical to electrical translator translating the mechanical position of the rotatable selector to an electrical signal that is related to the desired parameter value.

2. A thermostat according to claim 1 wherein the mechanical to electrical translator includes a potentiometer having a rotatable shaft that rotates about the second rotation axis, the mechanical to electrical translator further having one or more gears, wherein the one or more gears translate the mechanical position of the rotatable selector along the first rotation axis to a position of the rotatable shaft of the potentiometer along the second rotation axis, and the potentiometer translates the position of the rotatable shaft of the potentiometer along the second rotation axis to an electrical signal that is related to the desired parameter value.

3. A thermostat according to claim 2 wherein the rotatable selector is attached to a first gear having teeth, and the rotatable shaft of the potentiometer is attached to a second gear having teeth, wherein the teeth of the first gear engage the teeth of the second gear.

4. A thermostat according to claim 3 wherein the first gear circumscribes at least part of the rotatable selector.

5. A thermostat according to claim 3 wherein the second gear circumscribes at least part of the rotatable shaft of the potentiometer.

6. A thermostat according to claim 3 wherein the first gear is larger than the second gear.

7. A thermostat according to claim 2 wherein the rotatable selector rotates in a range of 180 degrees or less, causing the rotatable shaft of the potentiometer to rotate in unity with the rotatable selector.

8. A thermostat according to claim 2 wherein the rotatable selector rotates a first number of degrees, causing the rotatable shaft of the potentiometer to rotate a second number of degrees, wherein the second number of degrees is greater than the first number of degrees.

9. A thermostat according to claim 1 wherein the mechanical to electrical translator includes one or more belts.

10. A thermostat according to claim 1 wherein the mechanical to electrical translator includes one or more engaging wheels.

11. A thermostat according to claim 1 further comprising a circuit board that is fixed relative to the thermostat housing, and wherein the mechanical to electrical translator includes a potentiometer mounted to the circuit board.

12. A thermostat according to claim 1 wherein the rotatable selector includes a face plate that is fixed relative to the support member, and a rotatable dial that is rotatable relative to the support member.

13. A thermostat according to claim 12 wherein the face plate includes a temperature scale, and the rotatable dial includes a pointer.

14. A thermostat according to claim 12 further comprising a temperature indicator fixed relative to the support member.

15. A thermostat according to claim 14 wherein the face plate includes a temperature scale and the temperature indicator includes a pointer.

16. A thermostat according to claim 15 wherein the temperature indicator includes a bi-metal thermometer.

17. A thermostat according to claim 12 wherein the face plate includes a logo region with a logo provided thereon.

18. A thermostat according to claim 12 further comprising a housing ring having an aperture therein, wherein the housing ring is fixed relative to the thermostat housing and the aperture is adapted to accept the face plate.

19. A thermostat according to claim 1 wherein the mechanical to electrical translator includes a magnetic position sensor.

20. A thermostat according to claim 1 wherein the mechanical to electrical translator includes a mechanical slider.

21. A thermostat according to claim 1 wherein the mechanical to electrical translator includes an optical position sensor.

22. A thermostat comprising:
a thermostat housing having a support post;
a rotatable selector rotatably coupled to the thermostat housing with at least part of the rotatable selector disposed about, and being rotatable with respect to, the support post of the thermostat housing, the rotatable selector having a range of rotatable positions, wherein a desired parameter value is identified by the position of the rotatable selector along the range of rotatable positions; and
a mechanical to electrical translator laterally offset relative to the support member for translating the mechanical position of the rotatable selector to an electrical signal that is related to the desired parameter value.

23. A thermostat comprising:
a thermostat housing defining a housing surface area, the housing surface area having a housing centroid;
a rotatable selector rotatably coupled to the thermostat housing via a support member, the rotatable selector having a range of rotatable positions, wherein a desired parameter value is identified by the position of the rotatable selector along the range of rotatable positions; and
a rotatable mechanical to electrical translator for translating the mechanical position of the rotatable selector to an electrical signal that is related to the desired parameter value; wherein the rotatable selector and the rotatable mechanical to electrical translator rotate in opposite directions when the rotatable selector is rotated.

24. A thermostat according to claim 23 wherein the support member is disposed at the housing centroid.

25. A thermostat comprising:
a thermostat housing;
a rotatable selector rotatably coupled to the thermostat housing, the rotatable selector having a range of rotatable positions, wherein a desired parameter value is identified by the position of the rotatable selector along the range of rotatable positions, the rotatable selector having a pattern disposed thereon; and
a mechanical to electrical translator for translating the mechanical position of the rotatable selector to an electrical signal that is related to the desired parameter value, the mechanical to electrical translator including means for sensing the pattern on the rotatable selector and to determine a mechanical position of the rotatable selector therefrom.

26. A thermostat according to claim 25 wherein the means for sensing includes an optical sensor.

27. A thermostat according to claim 25 wherein the means for sensing includes a magnetic sensor.

28. A thermostat according to claim 25 wherein the pattern is printed on the rotatable selector.

29. A thermostat according to claim 25 wherein the pattern is printed on a tape, and the tape is adhered to the rotatable selector.

30. A thermostat comprising:
a non-rotatable region;
a rotatable selector extending around at least part of the non-rotatable region, the rotatable selector having a range of rotatable positions, wherein a desired parameter value is identified by the position of the rotatable selector along the range of rotatable positions, the rotatable selector having a rotation axis; and
a mechanical to electrical translator comprising a rotation axis that is laterally offset relative to the rotation axis of the rotatable selector, the mechanical to electrical translator translating the mechanical position of the rotatable selector to an electrical signal that is related to the desired parameter value.

31. A thermostat according to claim 30 wherein the non-rotatable region includes a display.

32. A thermostat according to claim 30 wherein the non-rotatable region includes a button.

33. A thermostat according to claim 30 wherein the non-rotatable region includes an indicator light.

34. A thermostat according to claim 30 wherein the non-rotatable region includes a noise making device.

35. A thermostat according to claim 30 wherein the non-rotatable region includes a logo.

36. A thermostat comprising:
an electronic display for displaying information;
a rotatable selector having a range of rotatable positions relative to the display, wherein a desired parameter value is identified by the position of the rotatable selector along the range of rotatable positions, the rotatable selector having a rotation axis;
a mechanical to electrical translator for translating the mechanical position of the rotatable selector to an electrical signal that is related to the desired parameter value.

37. A thermostat according to claim 36 wherein the desired parameter value is displayed on the display.

38. A thermostat according to claim 37 wherein the desired parameter value that is displayed on the display changes as the rotatable selector is rotated.

39. A thermostat comprising:
a non-rotatable region;
a rotatable selector extending around at least part of the non-rotatable region, the rotatable selector having a range of rotatable positions, wherein a desired parameter value is identified by the position of the rotatable selector along the range of rotatable positions, the rotatable selector having a rotation axis; and
a mechanical to electrical translator laterally offset relative to the rotation axis of the rotatable selector for translating the mechanical position of the rotatable selector to an electrical signal that is related to the desired parameter value.

* * * * *